(12) United States Patent
Shimamura et al.

(10) Patent No.: US 11,307,332 B2
(45) Date of Patent: Apr. 19, 2022

(54) DIFFUSION SHEET, LAMINATED PRISM SHEET, AND LAMINATED OPTICAL SHEET

(71) Applicant: SUNTECHOPT CO., LTD., Osaka (JP)

(72) Inventors: Yukio Shimamura, Osaka (JP); Kiyoshi Sakai, Osaka (JP)

(73) Assignee: SUNTECHOPT CO., LTD., Osaka (JP)

(*) Notice: Subject to any disclaimer, the term of this patent is extended or adjusted under 35 U.S.C. 154(b) by 78 days.

(21) Appl. No.: 16/689,366

(22) Filed: Nov. 20, 2019

(65) Prior Publication Data

US 2020/0088919 A1    Mar. 19, 2020

Related U.S. Application Data

(63) Continuation of application No. 15/532,979, filed as application No. PCT/JP2015/006073 on Dec. 7, 2015, now abandoned.

(30) Foreign Application Priority Data

Dec. 5, 2014   (JP) ................................ 2014-247435

(51) Int. Cl.
*G02B 5/02* (2006.01)
*F21V 8/00* (2006.01)
*G02B 27/28* (2006.01)

(52) U.S. Cl.
CPC ......... *G02B 5/0231* (2013.01); *G02B 5/0215* (2013.01); *G02B 5/0278* (2013.01);
(Continued)

(58) Field of Classification Search
CPC .. G02B 5/0231; G02B 5/0215; G02B 5/0268; G02B 5/0278; G02B 6/0051;
(Continued)

(56) References Cited

U.S. PATENT DOCUMENTS

2005/0147374 A1   7/2005   Gardiner
2008/0049330 A1   2/2008   Tolbert et al.
(Continued)

FOREIGN PATENT DOCUMENTS

JP   2000-352607 A   12/2000
JP   2010-533893 A   10/2010
(Continued)

OTHER PUBLICATIONS

"International Search Report", PCT/JP2015/006073, dated Feb. 23, 2016, 2 pages.

*Primary Examiner* — George G. King
(74) *Attorney, Agent, or Firm* — Ogilvie Law Firm

(57) ABSTRACT

Provided is a diffusion sheet having a function for preventing warping, and having excellent optical and diffusion characteristics. A diffusion sheet 1 has a minute roughness pattern formed on the surface thereof, the pattern configured such that first protrusions 3a having a first height and second protrusions 3b having a second height lower than the first height are disposed in parallel. A portion of the first protrusions 3a is bonded to a bonding layer on the rear surface of an upper-layer sheet laminated on the surface of a diffusion sheet 2, and the second protrusions 3b are not bonded to said bonding layer. The following relationships are satisfied: $h_1:h_2=1:0.5\text{-}0.1$, and $w_1:w_2=1:1.0\text{-}0.1$, where $h_1$ is the height of the first protrusions 3a, $w_1$ is the width of the first protrusions 3a, $h_2$ is the height of the second protrusions 3b, and $w_2$ is the width of the second protrusions 3b.

11 Claims, 8 Drawing Sheets

(52) U.S. Cl.
CPC ......... *G02B 6/0051* (2013.01); *G02B 6/0053* (2013.01); *G02B 5/0221* (2013.01); *G02B 5/0268* (2013.01); *G02B 6/0056* (2013.01); *G02B 27/283* (2013.01)

(58) Field of Classification Search
CPC .. G02B 6/0053; G02B 6/0056; G02B 27/283; G02B 5/0221
See application file for complete search history.

(56) References Cited

U.S. PATENT DOCUMENTS

| | | |
|---|---|---|
| 2009/0021841 A1 | 1/2009 | Negley et al. |
| 2010/0066942 A1 | 3/2010 | Teragawa |
| 2012/0111471 A1 | 5/2012 | Negley et al. |
| 2015/0029729 A1 | 1/2015 | Liu et al. |
| 2016/0341882 A1 | 11/2016 | Cho et al. |
| 2017/0115433 A1 | 4/2017 | Kim et al. |
| 2017/0153363 A1 | 6/2017 | Lee et al. |
| 2018/0120626 A1* | 5/2018 | Min .................. G02F 1/133504 |

FOREIGN PATENT DOCUMENTS

| | | |
|---|---|---|
| JP | 2010-256797 A | 11/2010 |
| JP | 2010-287546 A | 12/2010 |
| JP | 2012-247559 A | 12/2012 |
| JP | 2013-68834 A | 4/2013 |
| JP | 2014-160187 A | 9/2014 |

* cited by examiner (PRIOR ART)

(1)          (2)

(PRIOR ART)

(PRIOR ART)

(PRIOR ART)

| Prototype No. | Height of protrusions Δd₁ (μm) | Bonding layer thickness N₁ (μm) | Brightness reduction rate after bonding | Diffusion performance evaluation |
|---|---|---|---|---|
| 1 | 6.2 | 5.0 | −6.1% | △(Fair) |
| 2 | 16.6 | 5.0 | −7.1% | ○(Good) |
| 3 | 8.8 | 6.0 | −6.4% | ○(Good) |
| 4 | 8.8 | 5.0 | −18.4% | ○(Good) |

DIFFUSION SHEET, LAMINATED PRISM SHEET, AND LAMINATED OPTICAL SHEET

RELATED APPLICATIONS

The present application is a continuation of U.S. patent application Ser. No. 15/532,979 filed Jun. 2, 2017, which is a national entry under 35 USC 371 of PCT patent application no. PCT/JP2015/006073 filed Dec. 7, 2015, which claims priority to Japanese patent application no. 2014-247435 filed Dec. 5, 2014. Priority to each of these applications is claimed to the full extent allowed by law, and each of these applications is hereby incorporated by reference in its entirety.

TECHNICAL FIELD

The present invention relates to a light diffusion sheet, a laminated prism sheet and a laminated optical sheet having a non-warping function for preventing waviness (warping) caused by thinning of an optical film.

BACKGROUND ART

A backlight unit employed in a liquid crystal panel is known to be comprised of a structure wherein a diffusion sheet, a prism sheet and a light guide plate are physically stacked. (Refer to the patent literature 1, for example.) Namely, as shown in FIG. 9, a backlight unit is configured with a light-guiding plate 30 for guiding light from a light source 32 and a reflective sheet 34 with a lower diffusion sheet 2, a lower prism sheet 11 and an upper prism sheet with a diffusion function thereon. Above an upper prism sheet 21 a liquid crystal panel is placed. A liquid crystal panel 40 has a configuration wherein the front surface side and the back surface side of a liquid crystal cell 42 are sandwiched with polarizing plates (41, 43).

When the upper and lower prism sheets (11, 21) and the lower diffusion sheet are made to be thinner in the aim to make this backlight unit thinner, corrugation occurs at each sheet member due to the heat radiated from the LED, making mounting of the member difficult. For that reason, there is consequently a limit in thinness of prism sheets and diffusion sheets. Therefore, it becomes necessary to make the prism sheet and the diffusive sheet free of waviness in pursuing slimming and miniaturization of prism sheets and diffusion sheets.

FIG. 6 represents a cross sectional view of a backlight unit having a conventional structure configured with a prism sheet and a diffusive sheet physically stacked (an adhesive material not illustrated). It is necessary for the upper and lower prism sheets (11, 21) and the lower diffusive sheet 2 to have a waviness-free function in order to evade waviness generation with a good handling capability during mounting of the member. The display size of the current mobile information terminals is usually 4 to 5 inches and each thickness of D1, D2 and D3 in FIG. 6 needs to be thicker than 150 μm. As a result, the thickness of the backlight unit becomes thicker than 450 μm. In cases wherein each thickness of D1, D2 and D3 is smaller than 150 μm, problems such as appearance defects occur due to generation of waviness at each sheet under an influence of radiation heat by an LED light source of a backlight unit.

As a method to solve such a problem, a method to integrate the upper prism sheet 21, the lower prism sheet 11 and the lower diffusion sheet 2 by pasting all three together is studied. However, in a case wherein the lower prism sheet 11 and the upper prism sheet 21 are unified, an adhesion layer 23 is conventionally disposed at the back surface of the upper prism sheet 21 as shown in FIG. 7 (an enlarged view of the A portion in FIG. 6) and the adhesion layer 23 and the lower prism sheet 11 are pasted to achieve integration, which results in filling up of vertex portions of all the prism columns at the surface, which results in deterioration of optical performance in comparison with a case of not unifying sheets. Namely, in a case wherein the lower prism sheet 11 and the upper prism sheet 21 are integrated, there are such problems as not being able to obtain enough condensation performance.

Also, conventionally, in a case wherein the lower prism sheet 11 and the lower diffusion sheet 2 are integrated, an adhesion layer 13 is disposed at the back surface of the prism sheet 11 as shown in FIG. 8 (an enlarged view of the B portion in FIG. 6) and the adhesion layer 13 and the diffusion layer 3 of the lower diffusion layer are pasted together to be integrated, which causes complete filling of the diffusion layer 3 at the surface of the lower diffusion sheet 2 with an adhesion layer 3, resulting in a remarkable loss of the diffusion performance of the lower diffusion sheet 2, which is a problem.

As mentioned above, the deterioration of an optical performance and a diffusion performance resulting from integration of the upper prism sheet, the lower prism sheet and the lower diffusion sheet by the pasting of all the sheets.

PRIOR ART

Patent Literature

[Patent literature 1] JP 2000-352607 A

OUTLINE OF THE INVENTION

Problems to be Solved by the Invention

In view of such a circumstance, the present invention aims to present a diffusion sheet, a laminated prism sheet and a laminated optical sheet using aforementioned sheets, having a no-waviness function that prevents waviness (warping) generation with an excellent optical performance and a diffusion performance.

Means to Solve the Objects

Namely, the diffusion sheet according to the present invention is configured to have minute irregularities at its surface, with the first convex portion having the first height disposed in a parallel configuration and the second convex portion having a random height lower than the first height, disposed periodically or randomly.

And when an upper layer sheet is laminated to a diffusion sheet, a portion of the first convex portion is adhered to the adhesion layer at the back surface of the upper layer sheet laminated to the surface of the diffusion sheet and the second convex portion is not adhered.

By such a configuration, the diffusion sheet is securely fixed by a portion of the first convex portion being adhered to the adhesion layer at the back surface of the upper sheet, restraining the waviness (warping) of the diffusion sheet. Namely, the diffusion sheet is equipped with a non-waviness function (warping-less function). Also, the diffusion sheet becomes superb in its optical characteristics and diffusion characteristics as a whole because the second convex portion is not adhered to the adhesion layer of the diffusion sheet, evading or minimizing the decline of the diffusion performance of the second convex portion.

Here, in the diffusion sheet described above, it is preferable that the height difference between the height of the first convex portion and the height of the second convex portion is larger than the thickness of the adhesion layer. It is because the deterioration of the diffusion performance at the second convex portion of the diffusion sheet is prevented due to the fact that the vertex portion of the second convex portion is not adhered to the adhesion layer even when the first convex portion is securely adhered to the adhesion layer.

Also, for the diffusion sheet described above, it is preferable that a condition $h_1:h_2=1:x$ (x being 0.5~0.1) and $w_1:w_2=1:Y$ (y being 1.0~0.1) is satisfied when the height and width of the first convex portion is expressed by $h_1$ and $w_1$, and also the height and width of the second convex portion is expressed by $h_2$ and $w_2$, respectively.

The deterioration of the diffusion performance at the second convex portion can be avoided by providing a no-waviness function (warping-less function) to the diffusion sheet by making the height of the second convex portion ($h_1$) less than half the height of the first convex portion ($h_2$), making the vertex portion of the second convex portion not adhered to the adhesion region even when the first convex portion is firmly adhered to the adhesion layer of the upper sheet.

Also, the width of the second convex portion ($w_2$) is made to be the same to or shorter than the width of the first convex portion ($w_1$). This is a condition for adjusting the shape and the apex angle of the second convex portion. For example, when the height of the second convex portion ($h_2$) is half the height of the first convex portion ($h_1$), the width of the second convex portion ($w_2$) is made to be half the width of the first convex portion in order to make the shape of the first convex portion and the shape of the second convex portion equal. Supposing that the height of the second convex portion ($h_2$) is half the height of the first convex portion ($h_1$), the second convex portion has a convex shape with a gentler and wider foot than that of the first convex portion, if the width of the second convex ($w_2$) and the width of the first convex ($w_1$) are the same.

The diffusion sheet according to the present invention, the first convex portion is preferably linear. Making the first convex portion linear makes the molding easy, which improves the quality of the product. Also, the production cost can be reduced as a result that molding becomes easy. Although the arrangement under linearly placed convex portion is preferably a periodical parallel arrangement, a parallel arrangement with random intervals is also acceptable.

The diffusion sheet according to the present invention may have at least one second convex portion placed between the two neighboring first convex portions.

Because the vertex portion of the second convex portion lower than the height of the first convex portion is not adhered to the adhesion layer, the optical performance does not deteriorate and the high diffusion performance intrinsically aimed can be preserved. Therefore, the total diffusion performance of the diffusion sheet can be enhanced by placing a plural number of the second convex portion between the first convex portions. Note that the first convex portion and the second convex portion are alternatively arranged when one second convex portion is arranged between two adjacent first convex portions.

Also, in the diffusion sheet according to this invention, at least one second convex portion may be placed among a group of the first convex portions where only a plural number of first convex portions are adjacent to each other. Because the vertex portion of the first convex portion is adhered to the adhesion layer, the adhesion strength with the upper layer sheet can be further heightened by disposing a group of the first convex portion only the first convex portion is adjacent to.

The diffusion sheet according to the present invention does not preferably contain light scattering particles. In order to prevent generation of unevenness and faults caused by flocculation of the light scattering particles, a diffusion sheet is manufactured without using light scattering particles by forming unevenness at the mold surface and transferring the unevenness at the mold surface by using a UV curing resin or a thermoplastic resin.

Next, the laminated prism sheet according to the present invention is explained.

The laminated prism sheet according to the present invention is a prism sheet made of at least two layers with a surface having a prism column consisting of unit prisms in the shape of quasi triangular pole disposed in parallel with plurality, and the prism column of the lower layer prism sheet whereon the upper layer prism sheet is laminated consists of the plural number of the first prism columns having the first height and the plural number of the second prism columns having the second height lower than the first height, which are periodically placed. And the vertex portion of the first prism column is adhered to the adhesive layer at the back surface of the upper prism sheet, faulting a structure wherein the vertex portion of the second prism column is not adhered.

By furnishing a characteristics that the vertex portion of the first prism column of the lower prism sheet is adhered to the back surface of the upper prism sheet but the vertex portion of the second prism columns is not adhered, the problems that the optical performance deteriorates and enough condensation performance is not acquired resulting from filling of the vertex portion of all the prism columns at the surface of the lower layer prism when compared with the case wherein integration is not established, are avoided.

Also, formation of stain that occurs when prism sheets are stacked, which is caused by the fact that the prism height is not uniform and is called "wet out", can be suppressed.

In the laminated prism sheet according to the present invention, at least one second prism column can be disposed between two neighboring first prism columns. Because the vertex portion of the second prism column with a height lower than the height of the first prism column is not adhered to the adhesion layer, the optical performance is not deteriorated and the original light condensation performance can be maintained. Therefore, light condensation performance of the whole prism sheet can be heightened by arranging a plural number of the second prism columns between the first prism columns. Further, when one second prism column is placed between two neighboring first prism columns, the first prism column and the second prism column are disposed alternatingly.

Also, at least one second prism column may be disposed among the first prism column group wherein only a plural number of the first prism columns are neighboring. Because the vertex portion of the first prism column is adhered to the adherence layer, the adherence intensity can be heightened by disposing a neighboring first prism column group wherein only the first prism columns adjoin.

Here, it is preferable that the upper layer prism sheet according to the present invention is furnished with a diffusion layer having minute projecting-recessed shape at its back surface, adhesion layer is stacked to the diffusion layer and the refractive index of the adhesion layer $n_b$ and the refractive index of the diffusion layer $n_m$ satisfy the relationship [$n_b-n_m$ ]>0.1.

In this case, the upper layer prism sheet becomes an upper layer prism sheet furnished with a diffusion function.

The reason for setting up a predetermined refractive index difference to the refractive index $n_b$ of the adhesion layer and the refractive index $n_m$ of the diffusion layer is that the diffusion function of the diffusion layer can be exerted even when an adhesion layer is stacked over the diffusion layer.

The second height of the second prism column at the laminated prism sheet being 0.6~0.9 under an assumption that the height of the first prism column being 1, is a preferable mode according to this invention. If the height difference between the first height of the first prism column and the second height of the second prism column is too small, there is a shortcoming that the degree of coupling with the adhesion layer becomes week when the vertex portion of the first prism column at the lower layer prism sheet is adhered while the vertex portion of the second prism column is not adhered. On the other hand, if the height difference between the first height of the first prism column and the second height of the second prism column is too large, there is a shortcoming that the optical performance deteriorates when the vertex portion of the second prism column is not adhered while the vertex portion of the first prism column of the lower layer prism sheet is adhered, resultantly the engagement degree with the adhesion layer is strengthened while the portion adhered to the adhesion layer becomes larger. For that reason, it is preferable that the height difference between the first height of the first prism column and the second height of the second prism column is kept at the predetermined value.

When the height and the width of the first prism column is expressed by $m_1$, and $k_1$, respectively and the height of the second prism column is expressed by $m_2$ and $k_2$, respectively, for the laminated prism sheet according to the present invention, the preferable mode here is that the conditions $m_1:m_2=x$ (Note that x is 0.6~0.9) and $k_1:k_2=1:1$, are satisfied. These are conditions for obtaining an efficient diffusion effect and an optical effect. Note that the shape of the first prism column and the shape of the second prism column can be in similar figures.

Regarding the diffusion sheet according to the present invention, it is preferable that the mutual interval of the neighboring first convex portion is preferably 0.1~0.6 mm. By satisfying such a scope, it becomes possible to effectively constrain warping while maintaining an optical performance. When the mutual interval of the first convex portion is larger than 0.6 mm, filamentous pattern becomes recognizable by naked eyes, which is not preferable. When the mutual interval of the first convex portion is smaller than 0.1 mm, moire tends to easily appear deteriorating the optical performance, which is not preferable.

In the diffusion sheet according to the present invention, it is preferable that an air layer of 1~100 μm thickness is disposed between the adhesion layer laminated at the back surface of the upper layer sheet to be laminated at the surface of the diffusion sheet and the second convex portion. Disposition of air layer prevents deterioration of the optical performance and makes it possible to maintain the primary diffusion performance.

It is also acceptable that the shape of the top of the unit prism in the prism column at the lower layer prism sheet in the laminated prism sheet according to the present invention is curved and the top portion of the prism column in the lower prism sheet is in contact with the adhesion layer at the back surface of the upper layer prism sheet as a plane, without penetration. This arrangement of no penetration by the top portion of the unit prism prevents the deterioration of light condensing performance of the prism sheet, preventing the luminance deterioration. Also, if the laminated prism sheet with a conventional lower layer prism sheet having vertex portion of an acute angle is tried to be adhered without penetration of the vertex portion of the unit prism into the adhesion layer, the adhesion area is narrow and the boundary surface proximity between the adhesion point at the vertex portion and the adhesion layer can scarcely be expected and the adhesion strength was not enough unless the adhesion point penetrates into the adhesion layer by a μm order to heighten the strength of the adhesion layer from the viewpoint of elasticity. However, according to the laminated prism sheet of the present invention, the shape of the vertex portion has a curved surface providing a large adhesion area resulting in a large ratio of the boundary surface against the adhesion layer, which strengthens the electrostatic interaction at the boundary and further molecular bonding phenomenon at the boundary resulting in large adhesion strength and heightens the peeling strength.

Also, the shape of the vertex portion of the unit prism being round improves the viewing angle luminance characteristics.

With regard to the laminated prism sheet according to the present invention, the shape of the vertex portion of the unit prism of the prism column in the lower layer prism sheet is round and the vertex portion of the prism column in the lower prism sheet contacts the adhesion layer of the back surface of the upper prism sheet by a surface, the thickness of the adhesion layer is preferably 0.5~2 μm, when penetration does not occur, and more preferably 0.8~1.3 μm. Because the vertex portion of the unit prism does not penetrate the adhesion layer, it becomes possible to set the thickness of the adhesion layer thin as is described here.

The laminated optical sheet according to the present invention consists of a laminated prism sheet according to the present invention being laminated onto the diffusion sheet according to the present invention. Also, the laminated optical sheet according to the present invention may consist of an already known prism sheet laminated on the diffusion sheet according to the present invention. Furthermore, the laminated optical sheet according to the present invention may have a prism sheet that transmits P-wave and reflects S-wave laminated on the diffusion sheet according to the present invention. Because the prism sheet that transmits P-wave and reflects S-wave increases P-wave by polarizing the reflected S-wave by reflection at the reflection sheet, the brightness can be further improved.

Effects of the Invention

The diffusion sheet, the laminated prism sheet and the laminated optical sheet according to the present invention has no waviness (non-warping) function and at the same time shows excellency in optical characteristics and diffusion characteristics, as their effects.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Figure 1:
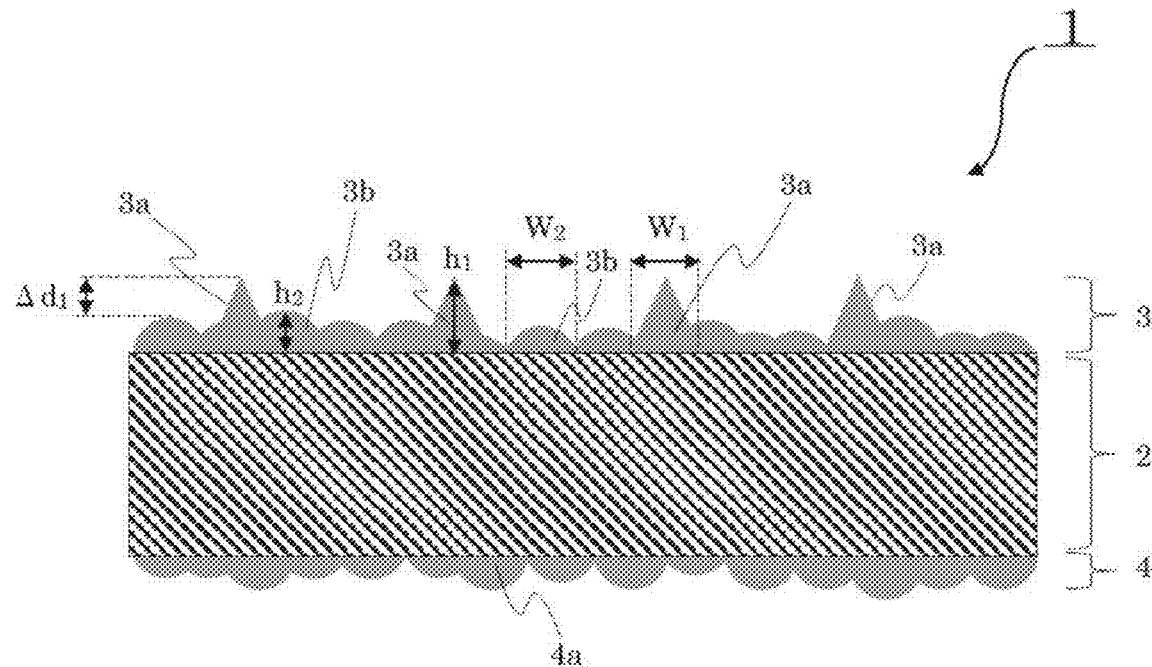
FIG. 1 illustrates a cross sectional configuration view of the diffusion sheet of the present invention.

FIG. 1 shows a cross sectional view of the diffusion sheet of the present invention. The diffusion sheet 1 having a convex portion with the surface of the diffusion sheet 2 whereon a diffusion layer 3 having a minute concave-convex shape with the first convex portion 3a having the first height and the second convex portion 3b having the height lower than the first height both arranged in parallel and the diffusion layer 4 having the convex portion 4a with a uniform or random height are formed.

And, to the adhesion layer (not illustrated) at the back surface of the upper sheet (not illustrated) laminated to the surface of the diffusion sheet 1, one portion of the first protruding portion 3a of the diffusion layer 3 is adhered and the second protruding portion of the diffusion layer 3 is not adhered.

Note that the diffusion sheet 1 in FIG. 1 is illustrated representing the height of the first convex portion 3a by $h_1$ and width by $w_1$, and the height of the second convex portion $3_b$ by $h_2$ and width $w_2$, with the assumption that the relationship above lies somewhere around $h_1:h_2=1:0.5$, $w_1:w_2=1:1$. Also, the difference between the height $h_1$ of the first convex portion 3 and the height $h_2$ of the second convex portion 2 is set larger than the thickness of the adhesion layer.

Figure 2:
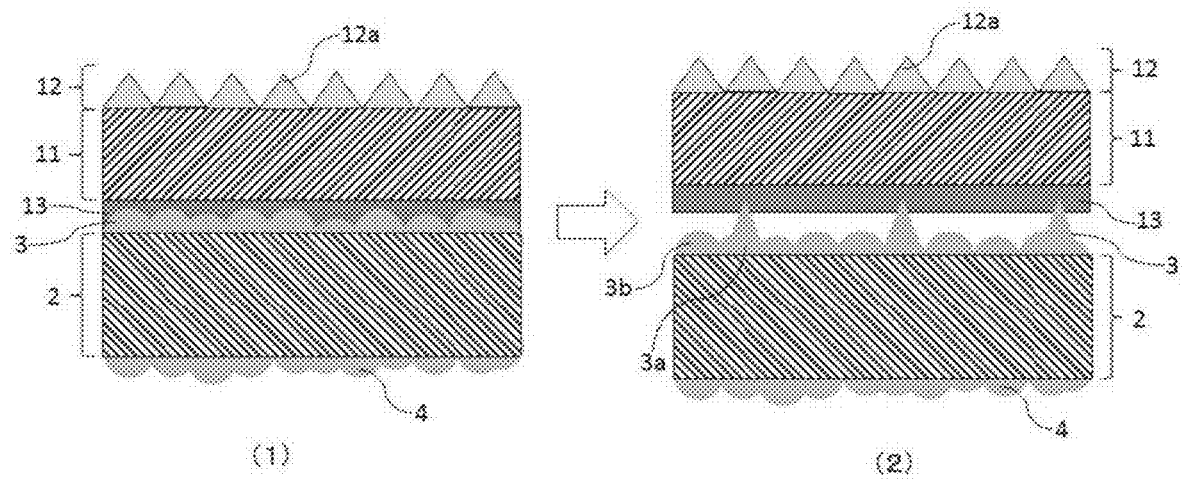
FIG. 2 illustrates a comparison view of the junction cross-sectional configuration of the lower prism sheet and the lower diffusion sheet.

FIG. 2 shows a comparison between the conventional configuration and the configuration of the diffusion sheet according to the present invention regarding the configuration of the adhesion cross section of the lower prism sheet and the diffusion sheet. FIG. 2 (1) represents the conventional configuration and the FIG. 2 (2) represents the diffusion sheet configuration according to the present invention. In the case of the conventional configuration shown in FIG. 2 (1), the height of the convex portion fouled at the diffusion layer 3 at the surface of the diffusion sheet (lower diffusion sheet) 2 is uniform and all the convex portions are structurally buried into the adhesion layer 13 at the back surface of the upper layer sheet (lower prism sheet) to be laminated to the surface. If the convex portion is buried, the diffusion performance is lowered and especially if all the convex portions are buried, diffusion performance is markedly deteriorated.

On the other hand, in the case of the diffusion sheet structure as shown in FIG. 2 (2), the height of the convex portion formed at the diffusion layer 3 at the diffusion sheet 2 (the lower diffusion sheet) is not uniform and the first convex portion 3a and the second convex portion 3b having a height lower than that of the first convex portion 3a are arranged in parallel, and it is arranged in such a way that only a part of the first convex portion 3a is adhered to the adhesion layer 13 at the back surface of the upper layer sheet (the lower prism sheet) laminated to the surface. Because the second convex portion 3b having a lower height is not adhered to the adhesion layer 13 at the back surface of the lower prism sheet 11, the diffusion performance of the second convex portion 3b. is maintained as it is. Accordingly, the diffusion sheet structure of the present invention provides a more excellent diffusion performance with only a small deterioration in diffusion performance, compared in the case of the conventional configuration.

Figures 11, 12:
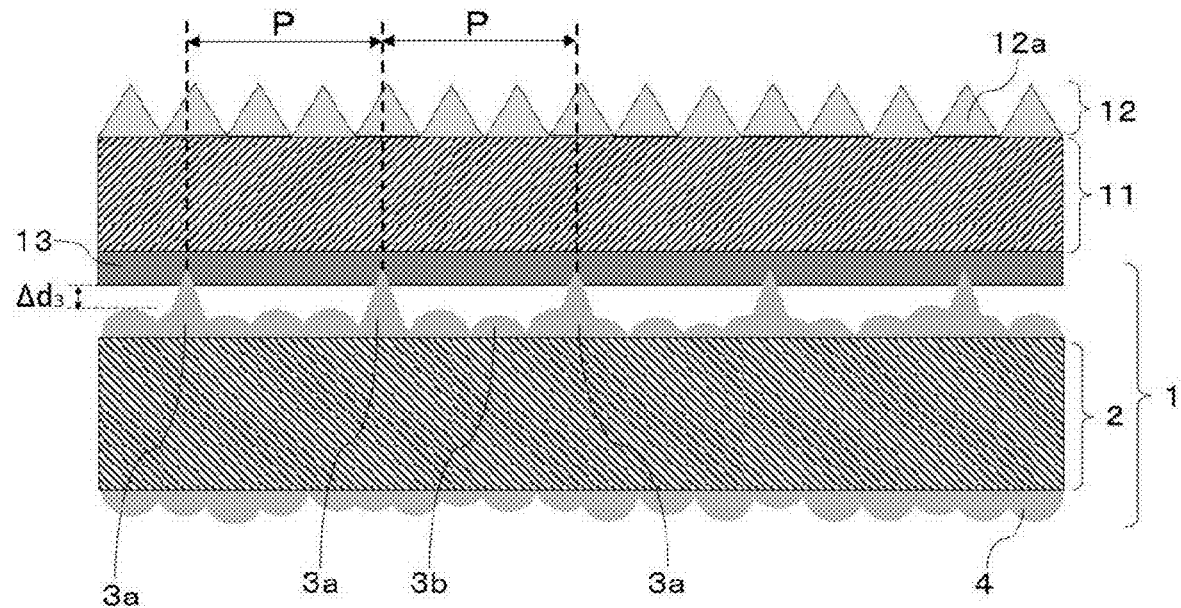
FIG. 11 illustrates a measurement results of brightness performance thereof.
FIG. 12 illustrates a cross sectional configuration view of a joining portion of the lower prism sheet and the diffusion sheet having convex portions.

FIG. 12 shows a cross sectional configuration drawing of the lower prism sheet and the diffusion sheet according to the present invention in a laminated state. As is shown in FIG. 12, the diffusion sheet 1 having convex portions has the diffusion sheet 2 with a diffusion layer 3 formed at the surface of the diffusion sheet 2, whereon the first convex portion 3a having the first height and the second convex portion 3b having the second height lower than the first height are arranged in parallel, and a diffusion layer 4 having convex portions of a uniform or random height 4a is formed at the back surface of the diffusion sheet 2.

And, to the adhesion layer 13 at the back surface of the lower prism sheet 11 laminated to the surface of the diffusion sheet 1, a portion of the first convex portion 3a at the diffusion layer 3 is adhered, and the second convex portion 3b at the diffusion layer 3 is not adhered. Here, the interval P of the neighboring first convex portion is 0.1~0.6 mm. Also, the height difference $\Delta d_3$ is 1~100 μm.

Figure 3:
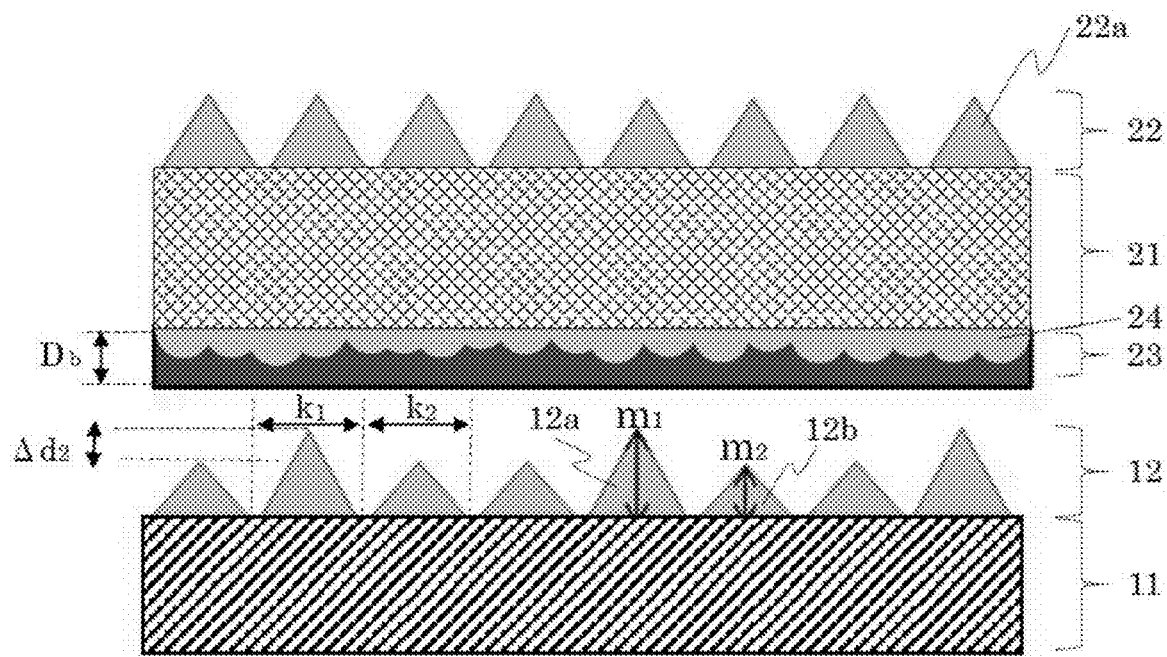
FIG. 3 illustrates a cross sectional configuration view of laminated prism sheet of the present invention.

FIG. 3 represents a cross sectional configuration of the adhesion portion of the upper prism sheet 21 and the lower prism sheet 11. At the lower prism sheet 11, a plural number of the first prism columns 12a having the first height and a plural number of the second prism columns 12b having the second height lower than the first height are periodically disposed. And, the convex portion of the first prism column 12a at the lower prism sheet 11 is adhered to the adhesion layer 23 at the back surface of the upper prism sheet 21, so that the convex portion of the second prism column 12b is not adhered.

In the case of the upper prism sheet 21 shown in FIG. 3, a plural number of prism columns 22a consisting of a unit prism in the shape of quasi triangular pole are disposed in parallel and a diffusion layer 24 at the convex portion with a height uniform or random is formed at the back surface and further an adhesion layer 23 is formed. Here, the thickness of the adhesion layer is expressed by $D_b$.

FIG. 3 illustrates the lower prism sheet 11 supposing the first prism column 12a having the height $m_1$ and the width $k_1$ and the second prism column 12b having the height $m_2$ and the width $k_2$, under an assumption that $m_1:m_2=1:0.5$ and $k_1:k_2=1:1$. Also, the difference $\Delta d_2$ between he height $m_1$ of the first prism column and the height $m_2$ of the second prism column 12b is set at a larger value than the thickness $D_b$ of the adhesion layer.

Figure 4:
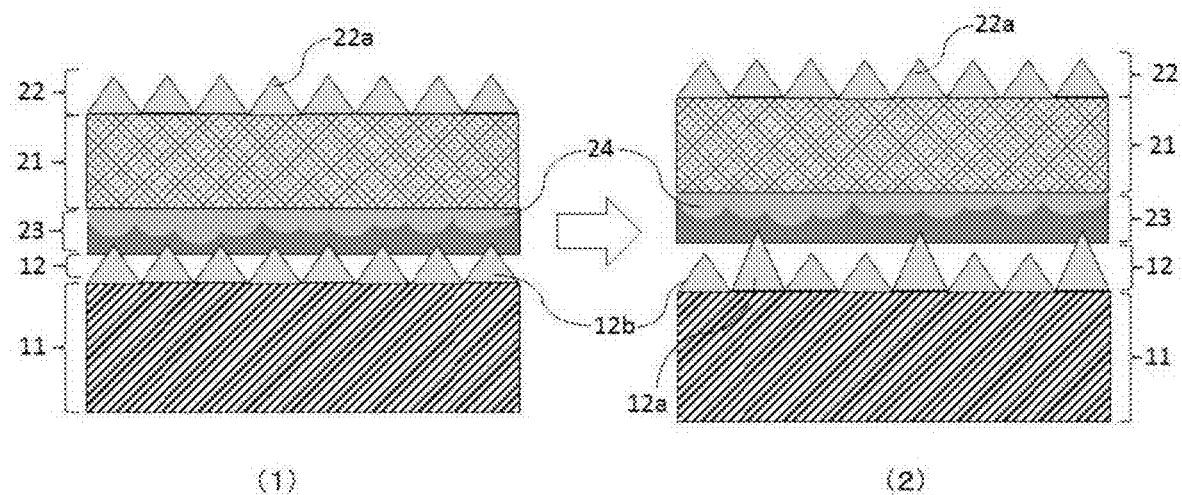
FIG. 4 illustrates a comparison view of the junction cross-sectional configuration of the upper prism sheet and the lower prism sheet.

FIG. 4 illustrates a comparison between the conventional configuration and the laminated prism sheet configuration according to the present invention regarding the adhesion cross sectional configuration between the upper prism sheet and the lower prism sheet. FIG. 4 (1) represents the conventional configuration and the FIG. 4 (2) represents the laminated prism sheet structure. In the conventional configuration as shown in FIG. 4 (1), the height of the prism column 12 at the surface of the lower prism sheet 11 is uniform and all the convex portion of the prism column 12 is configured to be embedded in the adhesion layer 23 at the back surface of the upper prism sheet 21 laminated to the surface of the lower prism sheet. When the convex portion of the prism column is embedded, the diffusion performance is degraded, especially if the vertex portion of the prism is embedded, the light condensation performance is degraded considerably.

On the other hand, in the case of the laminated prism sheet configuration according to the present invention as shown in FIG. 4 (2), the height of the prism column 12 at the surface of the lower prism sheet 11 is not uniform and the first prism column 12a and the second prism column 12b higher than the first prism column 12a are periodically arranged in parallel and only the first prism column 12a is configured to be adhered to the adherence layer 23 at the back surface of the upper prism sheet 21 laminated to the surface. And the second prism column 12b with a low height is not adhered to the adherence layer 23 at the back surface and consequently the light condensation of the second prism column 12b is preserved as it is. Therefore, the laminated prism sheet configuration according to the present invention shows little deterioration in comparison with the conventional configuration and it turns out that the light condensation/diffusion performance is excellent as a whole prism system.

Figure 5:
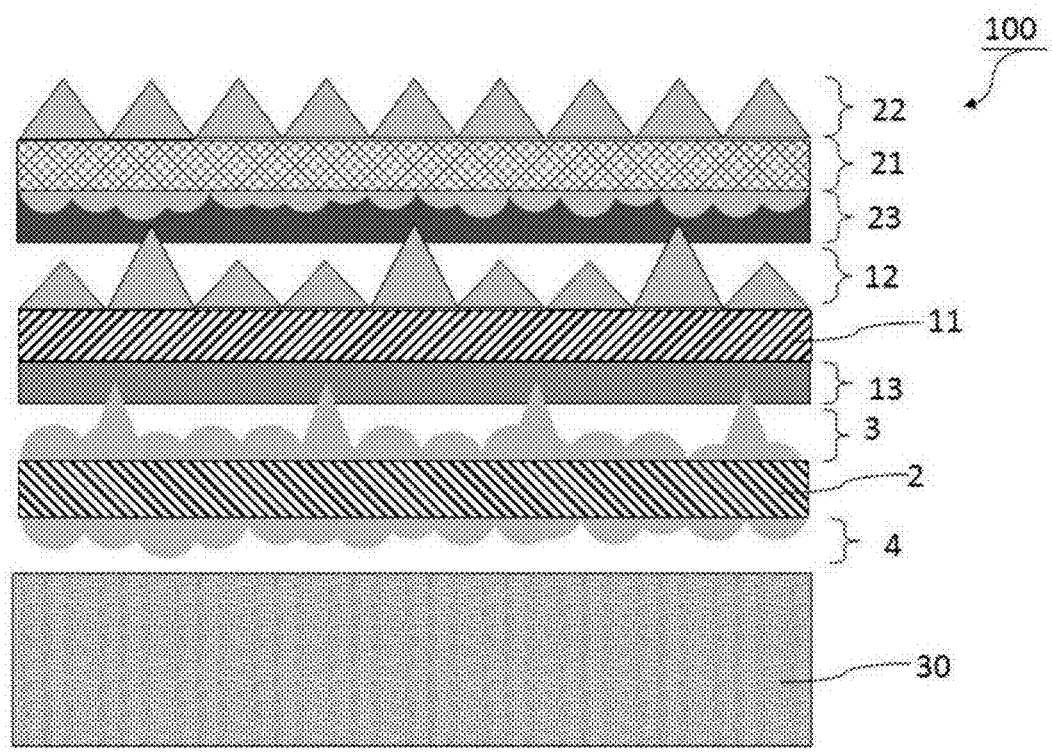
FIG. 5 illustrates a cross sectional configuration view of the laminated optical sheet of the present invention.
Figure 6:
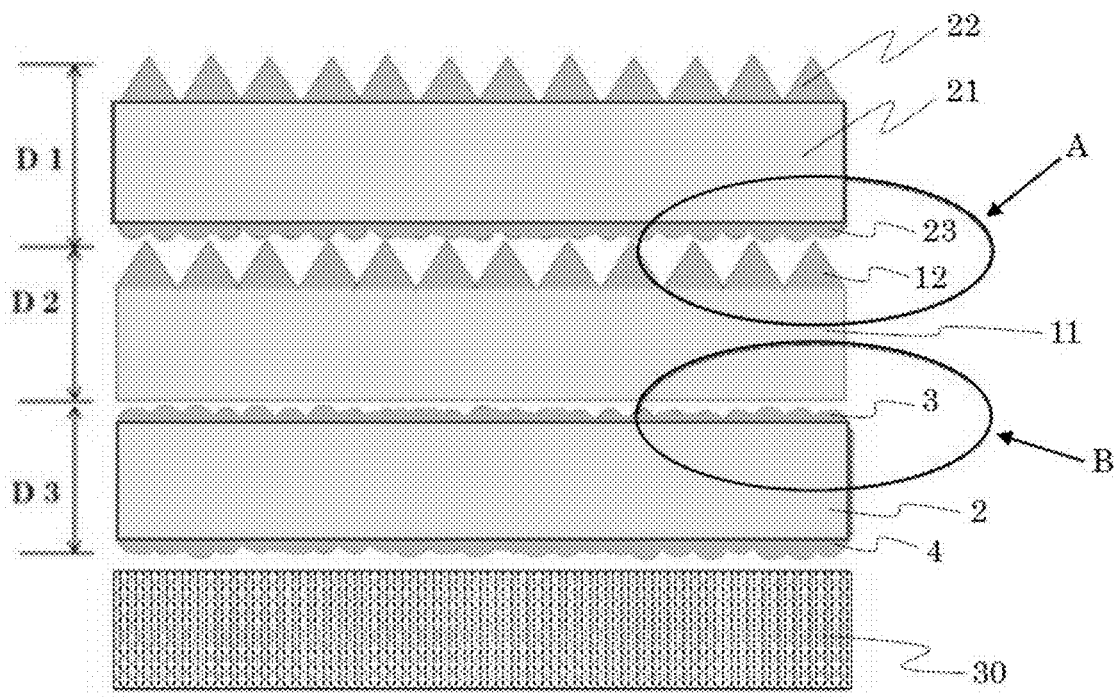
FIG. 6 illustrates a cross sectional configuration view of a backlight unit having a conventional structure.
Figure 7:
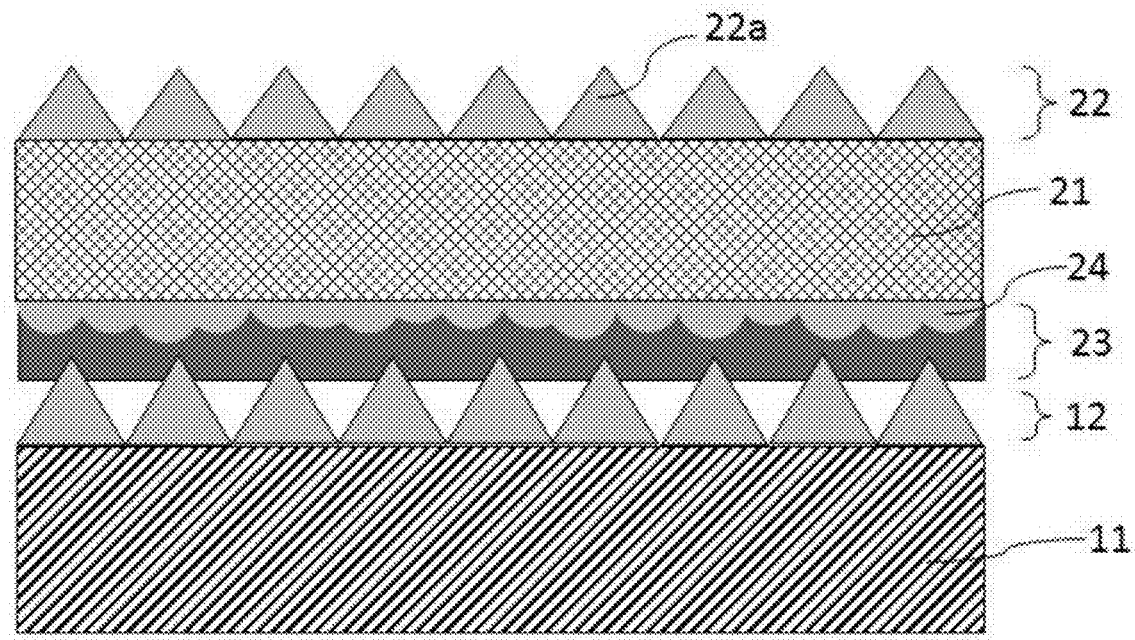
FIG. 7 illustrates a cross sectional configuration view of a conventional joining portion between an upper prism sheet and a lower prism sheet.
Figure 8:
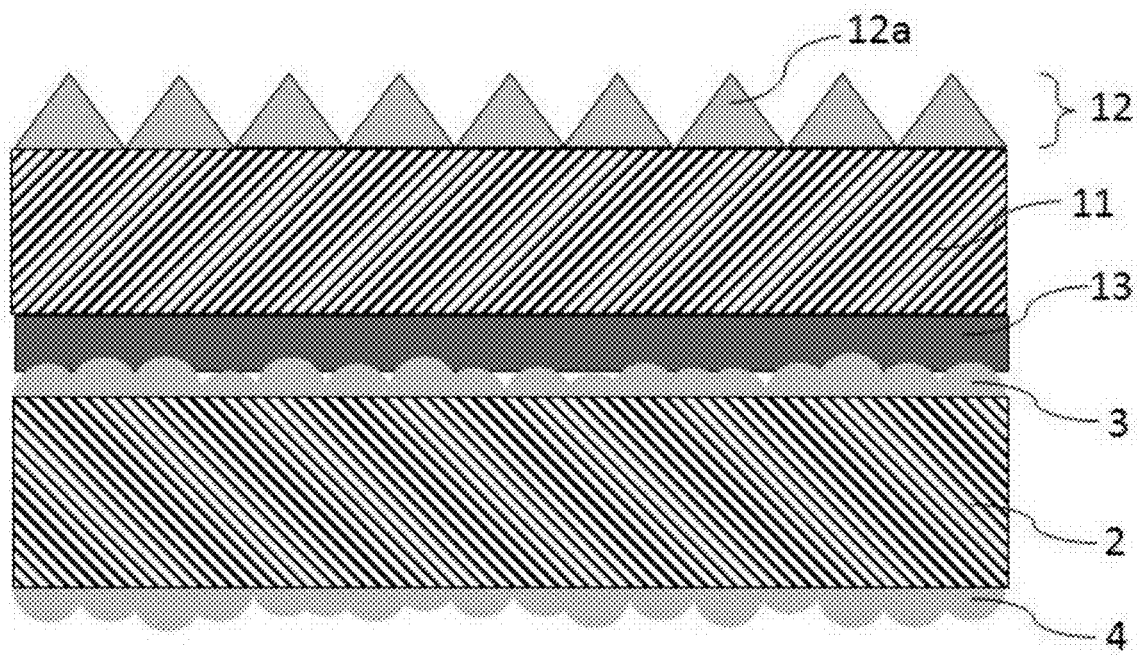
FIG. 8 illustrates a cross sectional configuration view of a joint portion of a conventional lower prism sheet and a lower diffusion sheet.
Figure 9:
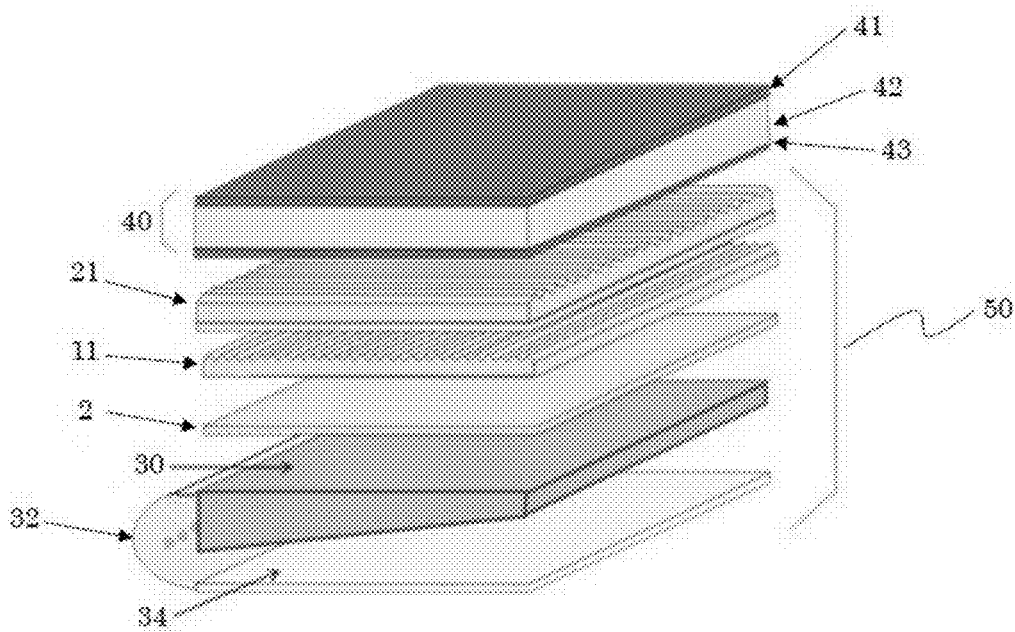
FIG. 9 illustrates a structural view of a liquid crystal panel.

FIG. 5 shows the cross sectional schematics of the laminated optical sheet according to the present invention. The laminated optical sheet according to the present invention consists of the lower diffusion sheet 2, the lower prism sheet 11 and the upper prism sheet 21 with a light diffusion function being laminated onto the light-guiding plate 30.

The first convex portion having the first height and the second convex portion having the second height lower than the first height are arranged in parallel on the lower diffusion sheet 2. Between the neighboring first convex portions, one or more second convex portions are disposed. In the case of FIG. 5, the convex portions are configured in parallel with the second convex portions being continuously arranged with one first linear convex portion.

A part of the first convex portion is adhered to the adherence layer 13 at the back surface of the lower prism sheet 11 laminated to the surface of the lower diffusion sheet 2 and the second convex portion is not adhered. Also, a diffusion layer 4 of the convex portion with a random or a uniform height are formed at the back surface of the lower diffusion sheet 2.

At the surface of the upper prism sheet 21, a prism layer 22 whereon prism columns of uniform height and width are arranged in parallel is formed and a diffusion layer of a convex portion with uniform height is formed at the back surface and at the same time an adhesion layer 23 is formed. And at the lower prism sheet 11, a prism layer 12 whereon a plural number of the first prism columns having the first height and a plural number of the second prism columns having the second height lower than the first height is formed and the vertex portion of the first prism column at the lower prism sheet 11 is adhered to the adherence layer 23 at the back surface of the upper prism sheet 21 and the vertex portion of the second prism column is not adhered.

Embodiment 1

(Prototype Evaluation Result)

Figure 10:
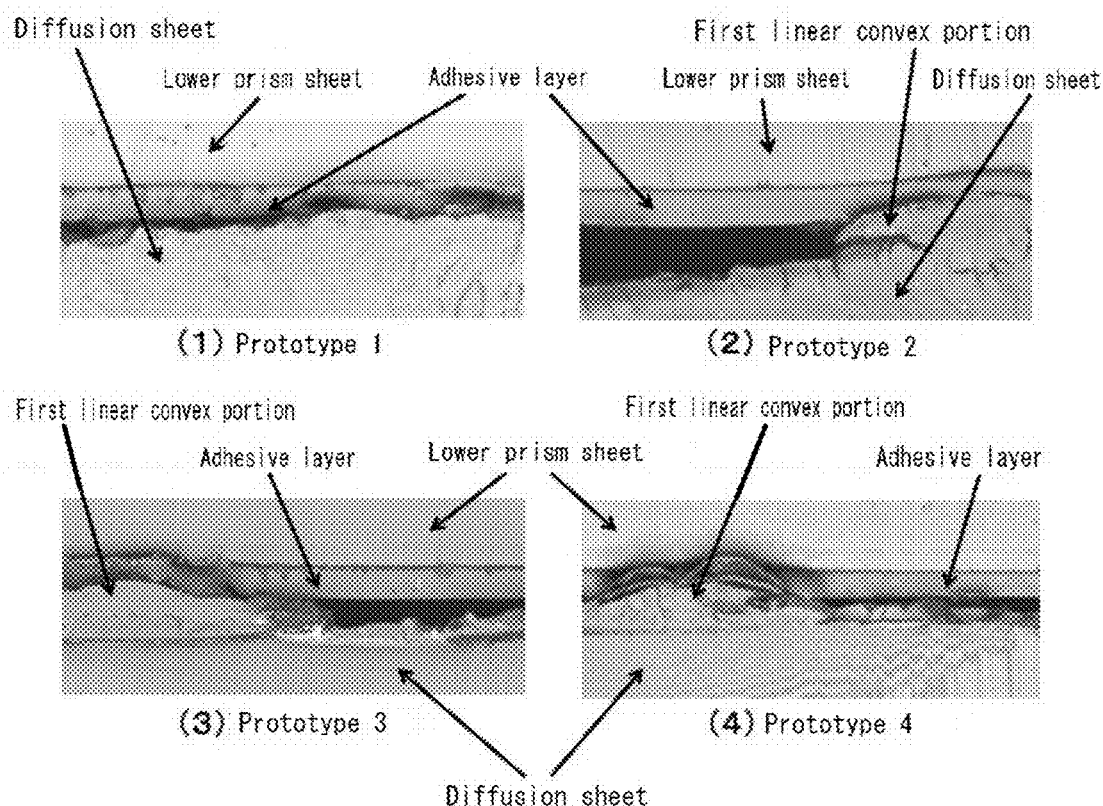
FIG. 10 illustrates an enlarged cross sectional photographs of prototypes.

Four kinds of prototypes (No. 1~4) were prepared by adhering the lower prism sheet and the diffusion sheet, and the enlarged cross sectional photographs and the measurement results of brightness performance thereof are shown in FIG. 10 and FIG. 11, respectively.

The enlarged cross sectional photographs shows the cross sectional view of the adhered sheet enlarged by 2000 times.

In the prototype 1, the height of the convex portion was not enough and the adhesive layer buried the diffusion portion almost entirely, resulting in the degradation of the diffusion performance. And in the prototypes No. 2 and No. 3, the lamination became possible while keeping the diffusion performance because the height of the vertex portion is larger than the thickness of the adhesion layer and excellency in diffusion performance could be confirmed. Note that the prototype No. 4 did not reveal the problem in diffusion performance, but the vertex portion thrusted into the upper prism sheet because the pressure at the time of adhesion was too strong (refer to the enlarged photograph) and resultantly the brightness drop became big.

Embodiment 2

Figure 13:
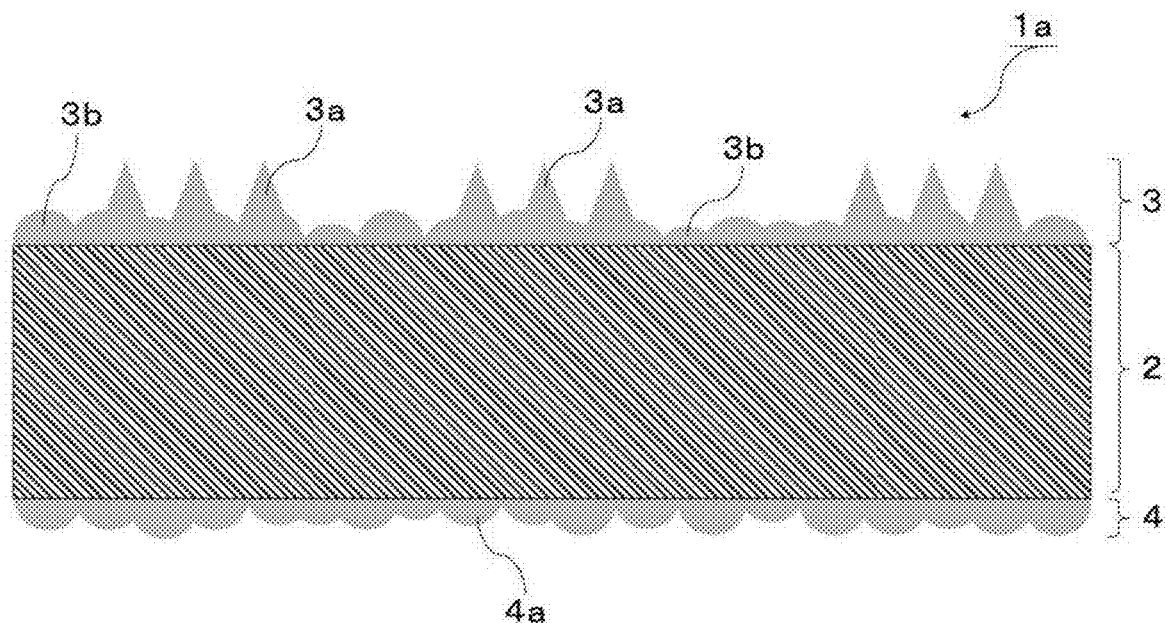
FIG. 13 illustrates a cross sectional configuration of the diffusion sheet according to embodiment 2.

FIG. 13 shows the cross sectional configuration of the diffusion sheet in embodiment 2.

As is shown in FIG. 13, the diffusion sheet 1a having a convex portion, similarly as the diffusion sheet 1 in FIG. 1, has the diffusion layer 3 of a minute concave-convex shape thereon the first concave portion 3a having the first height and the second concave portion 3b having the height lower than the first height are periodically positioned in parallel, and the diffusion layer 4 having the concave portion 4a of uniform or random height is fouled at the back surface of the diffusion sheet 2.

However, in contrast to the fact that a plural number of the second convex portion 3b was disposed between one first convex portion 3a and one first convex portion 3a in FIG. 1, the embodiment here includes the three first convex portion 2a and a plural number of the second convex portion 3b disposed among the first convex portion 3a. By disposing many first convex portions 3a, it becomes possible to heighten the adhesion strength when the diffusion sheet 1a is adhered to the upper layer sheet. Although not illustrated in FIG. 13, the first convex portion 3a is disposed linearly from the front side to the bottom side.

Embodiment 3

Figure 14:
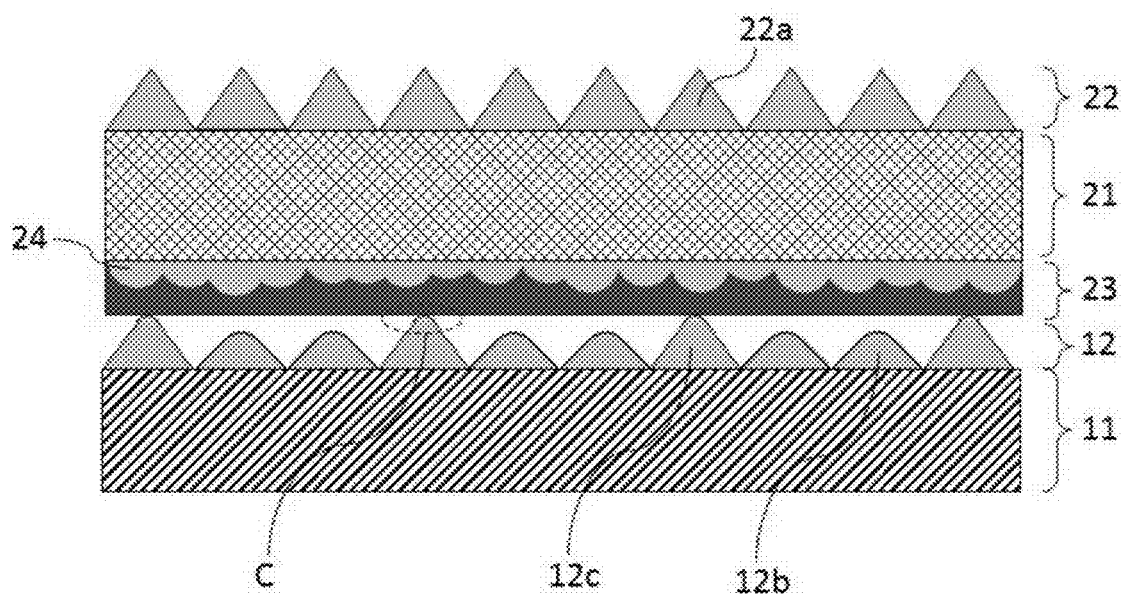
FIG. 14 illustrates a cross sectional configuration of the adherence portion between the upper prism sheet and the lower prism sheet according to embodiment 3.

FIG. 14 represents a cross sectional configuration of the adherence portion between the upper prism sheet 21 and the lower prism sheet 11 according to embodiment 3. At the lower prism sheet 11, a plural number of the first prism column 12c having the first height and the second prism column 12b having the second height lower than the first height are disposed periodically. And the vertex portion of the first prism column 12c of the lower prism sheet 11 butts the adherence layer 23 at the back surface of the upper prism sheet 21, while the vertex portion of the second prism column 12b is arranged not to butt.

Figure 15:
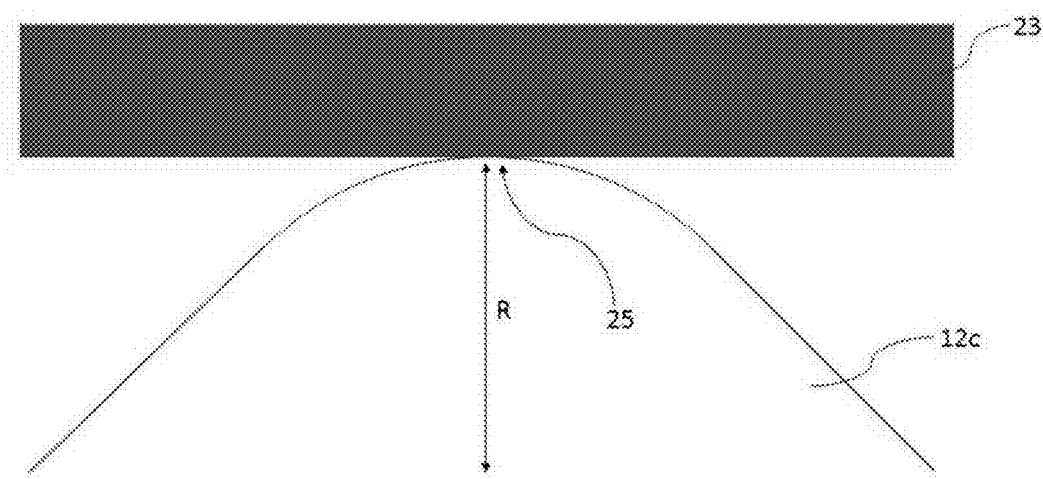
FIG. 15 illustrates an enlarged cross sectional view of the first prism column according to embodiment 3.

FIG. 15 shows an enlarged cross sectional view of the first prism column in embodiment 3, showing the enlarged view of the C portion in FIG. 14. Although luminance degradation occurs when the prism column is buried in the adhesion layer, the vertex portion 25 of the first prism column 12c is only in contact with the adhesion layer 23 as shown in FIG. 15, not penetrating. Therefore, the abutting width to the adhesion layer 23 becomes wider. Because FIG. 15 is a cross sectional configuration, an abutting actually occurs in plane. In this way, for the vertex portion of the prism column being curved, a brightness performance degradation can be prevented while enhancing the adhesion strength. Note that the vertex portion of the second prism column 12b is round similarly as the vertex portion 25 of the first prism column 12c, though not illustrated.

Also, the curvature radius R at the vortex portion 25 of the first prism column 12c is set at 3R. If the curvature radius at the vertex portion is smaller than 2R, the vertex portion of the unit prism is penetrated making brightness degradation obvious. Also, if the curvature radius at the vertex portion is larger than 5R, the original optical performance of the prism sheet becomes unattainable.

Other Embodiments

In contrast to embodiment 3, at the lower prism sheet, only the vertex portion of the plural number of the first prism column having the first height may be made to be round while making the vertex portion of the second prism column having an acute angle. By mixing the prism columns with the vertex portion being in curved shape and the prism columns with ones in sharp angle, it becomes possible to improve both the front brightness and the viewing angle brightness.

INDUSTRIAL APPLICATION POSSIBILITY

This invention is useful as an optical sheet composing a back light unit of the liquid crystal panel.

EXPLANATION OF SIGNS 1, 1a Diffusion sheet having a convex portion
2 Diffusion sheet
3a First convex portion
3b Second convex portion
3, 4, 24 Diffusion layer
11 Lower prism sheet
12, 22 Prism column
12a, 12c First prism columns
12b Second prism columns
13, 23 Adhesion layer
21 Upper prism sheet
22a Prism columns
25 Vertex portion
30 Light-guiding plate
32 Light source
34 Reflective sheet
40 Liquid crystal panel
41, 43 Polarizing plates
42, Liquid crystal cell
50 Backlight unit
A, B, C Enlarged view
D Thickness
P Interval
R Curvature radius
Δd Height difference
$h_1, h_2, m_1, m_2$ Height
$w_1, w_2, k_1, k_2$ Width

What is claimed is:

1. A laminated sheet, comprising:
a diffusion sheet having a diffusion sheet back surface and a diffusion sheet front surface, a diffusion sheet back surface diffusion layer laminated to the diffusion sheet back surface, the diffusion sheet back surface diffusion layer including convex portions of random diffusion heights, a diffusion sheet front surface diffusion layer laminated to the diffusion sheet front surface, the diffusion sheet front surface diffusion layer having convex portions of at least a first diffusion height and a second diffusion height;
a lower prism sheet having a lower prism sheet back surface and a lower prism sheet front surface, a lower prism sheet adhesion layer adhered to the lower prism sheet back surface, at least a portion of the diffusion sheet front surface diffusion layer convex portion of the first diffusion height adhered to the lower prism sheet adhesion layer, at least a portion of the diffusion sheet front surface diffusion layer convex portion of the second diffusion height not adhered to the lower prism sheet adhesion layer, a lower prism sheet prism layer laminated to the lower prism sheet front surface, the lower prism sheet prism layer having convex portions of at least a first prism height and a second prism height;
an upper prism sheet having an upper prism sheet back surface and an upper prism sheet front surface, an upper prism sheet adhesion layer adhered to the upper prism sheet back surface, at least a portion of the lower prism sheet prism layer convex portion of the first prism height adhered to the upper prism sheet adhesion layer, at least a portion of the lower prism sheet prism layer convex portion of the second prism height not adhered to the upper prism sheet adhesion layer, an upper prism sheet prism layer laminated to the upper prism sheet front surface, the upper prism sheet prism layer having convex portions.

2. The laminated sheet as set forth in claim 1, wherein a refractive index of the lower prism sheet adhesion layer $n_b$ and a refractive index of the diffusion sheet front surface diffusion layer $n_m$ satisfy $|n_b - n_m| > 0.1$.

3. The laminated sheet as set forth in claim 1, wherein at least some of a plurality of second diffusion heights are 0.6 to 0.9 times the first diffusion height.

4. The laminated sheet as set forth in claim 1, wherein the lower prism sheet prism layer convex portion includes a first prism column, the first prism column has first prism height $m_1$ and has a first prism column width $k_1$, the lower prism sheet prism layer convex portion includes a second prism column, the second prism column has second prism height $m_2$ and has a second prism width $k_2$, and wherein relationships $m_1:m_2=1:x$ and $k_1:k_2=1:1$ are satisfied, with x being in a range 0.6~0.9.

5. The laminated sheet as set forth in claim 1, wherein a column of the lower prism sheet prism layer convex portions has a same vertex shape or a same cross-section shape as a column of the upper prism sheet prism layer convex portions.

6. The laminated sheet as set forth in claim 1, wherein a vertex portion of a column of the lower prism sheet prism layer convex portions has a curved surface.

7. The laminated sheet as set forth in claim 1, wherein a thickness of at least one of the following is 0.5~5 µm: the lower prism sheet adhesion layer, or the upper prism sheet adhesion layer.

8. The laminated sheet as set forth in claim 1, wherein the random diffusion heights are disposed periodically on the diffusion sheet back surface diffusion layer.

9. The laminated sheet as set forth in claim 1, wherein the random diffusion heights are disposed randomly on the diffusion sheet back surface diffusion layer.

10. The laminated sheet as set forth in claim 1, wherein at least a portion of the lower prism sheet prism layer convex portions is disposed on the lower prism sheet prism layer in a periodical parallel arrangement.

11. The laminated sheet as set forth in claim 1, wherein at least a portion of the lower prism sheet prism layer convex portions is disposed on the lower prism sheet prism layer in a parallel arrangement with random intervals.

\* \* \* \* \*